(12) United States Patent
Geislinger

(10) Patent No.: US 6,293,871 B1
(45) Date of Patent: Sep. 25, 2001

(54) TORSIONALLY FLEXIBLE COUPLING

(75) Inventor: Matthias Geislinger, Salzburg (AT)

(73) Assignee: Ellergon Antriebstechnik GmbH, Hallwang/Salzburg (AT)

(*) Notice: Subject to any disclaimer, the term of this patent is extended or adjusted under 35 U.S.C. 154(b) by 0 days.

(21) Appl. No.: 09/612,012

(22) Filed: Jul. 7, 2000

(30) Foreign Application Priority Data

Aug. 10, 1999 (AT) .................................................. 1371/99

(51) Int. Cl.⁷ .................................................. F16D 3/52
(52) U.S. Cl. .................................. 464/77; 464/57; 464/89
(58) Field of Search .................................. 464/57, 58, 59, 464/60, 77, 89, 90; 74/574

(56) References Cited

U.S. PATENT DOCUMENTS

| | | | |
|---|---|---|---|
| 3,354,670 | * 11/1967 | Fawick | 464/89 |
| 4,194,372 | * 3/1980 | Hannibal | 464/90 |

FOREIGN PATENT DOCUMENTS

| | | |
|---|---|---|
| 40 06 121 | 8/1991 | (DE). |
| 42 01 597 | 7/1993 | (DE). |
| 43 38 039 | 5/1995 | (DE). |
| 223424 | * 1/1991 | (GB). |

* cited by examiner

Primary Examiner—Lynne H. Browne
Assistant Examiner—Aaron M Dunwoody
(74) Attorney, Agent, or Firm—Collard & Roe, P.C.

(57) ABSTRACT

The description refers to a torsionally flexible coupling with an outer rim (5) flexibly rotatable against a hub (1). To create favorable construction features, it is suggested to provide at least one ring-like compound body (2) between the hub (1) and the outer rim (5), consisting of at least one spiral layer (3) of an elastomer, with the threads of this spiral layer (3) being connected shear-resistant with a tensionally elastic and flexible intermediate layer (4), filling the spaces between the threads. The elasticity of tension and of shearing of this intermediate layer (4) are smaller than that of the elastomer layer (3).

4 Claims, 2 Drawing Sheets

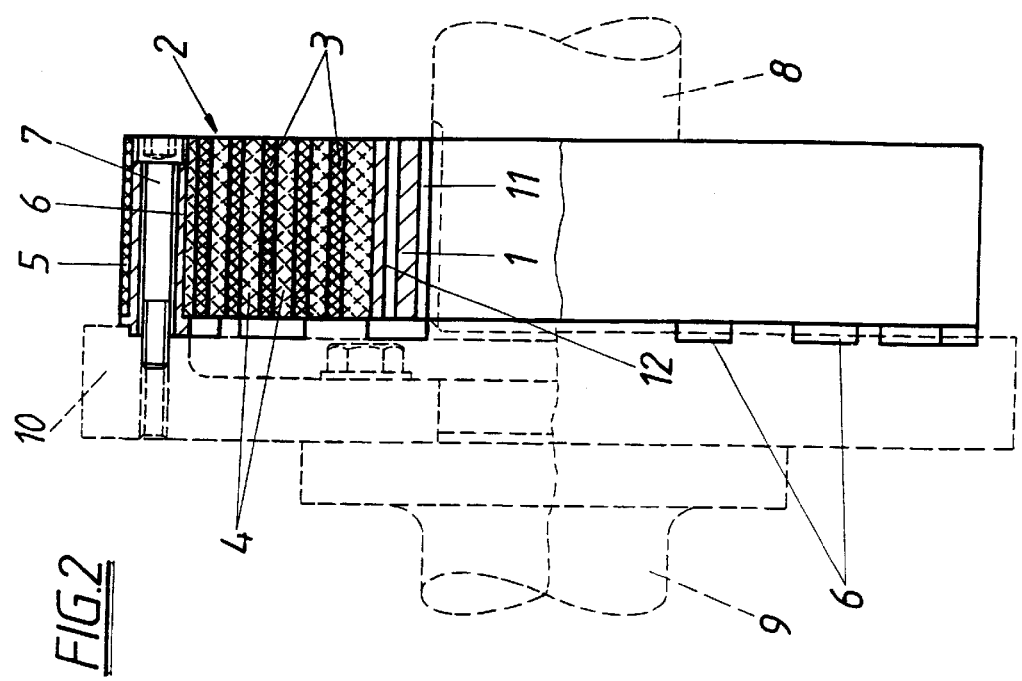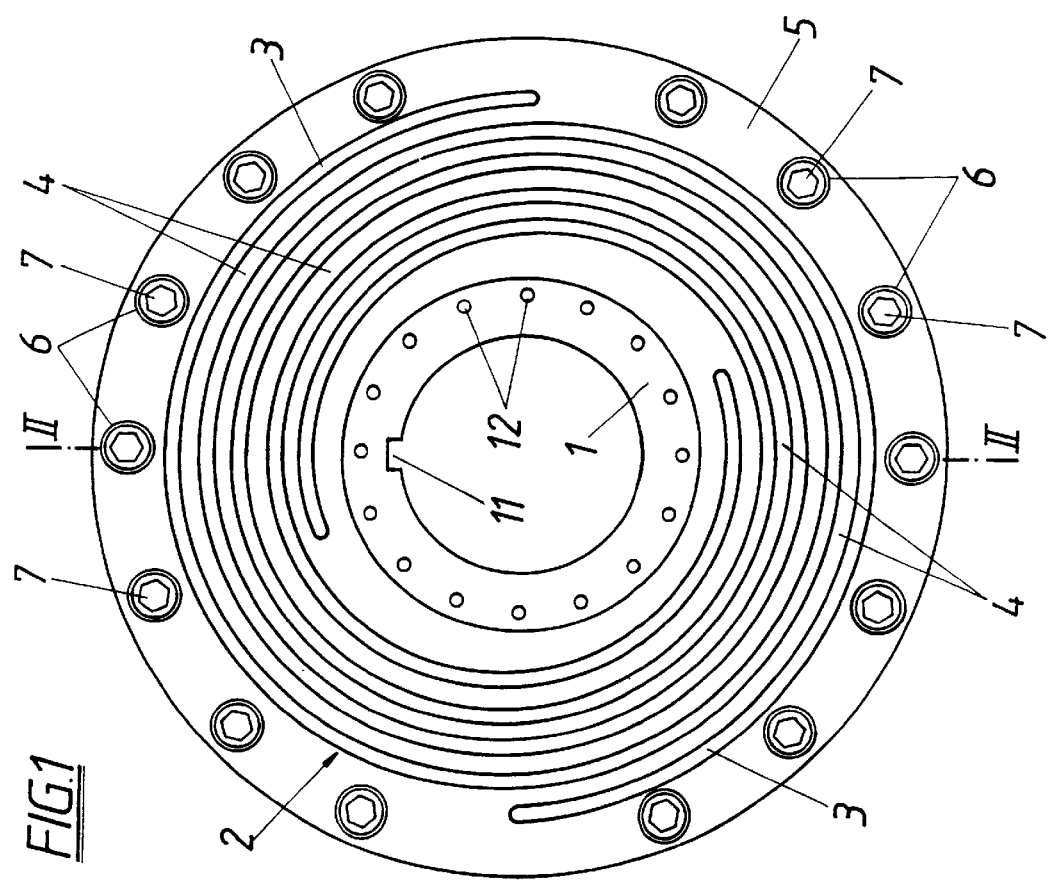

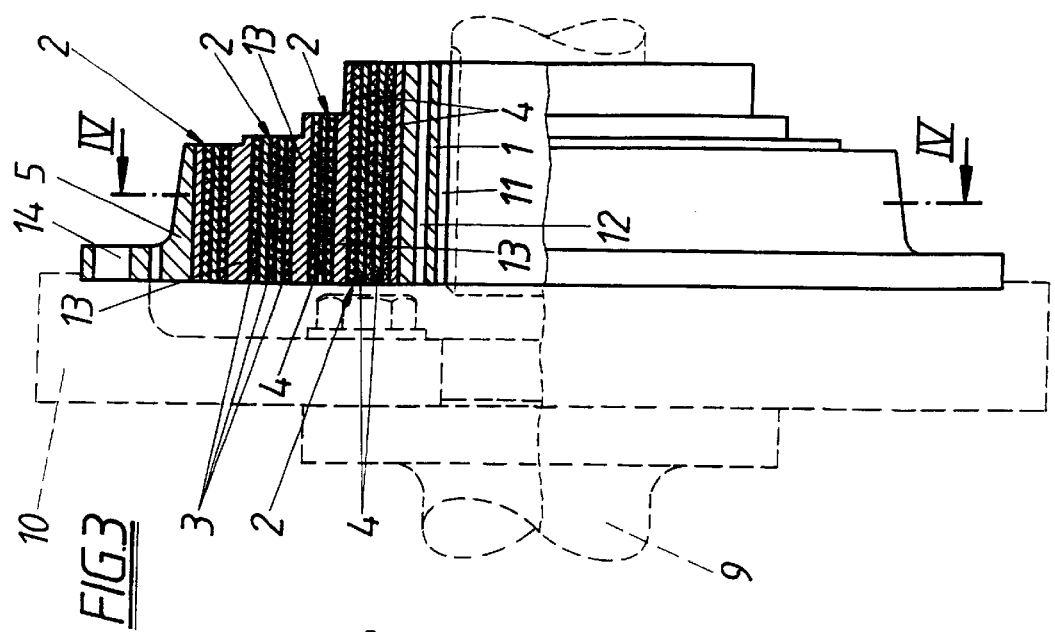
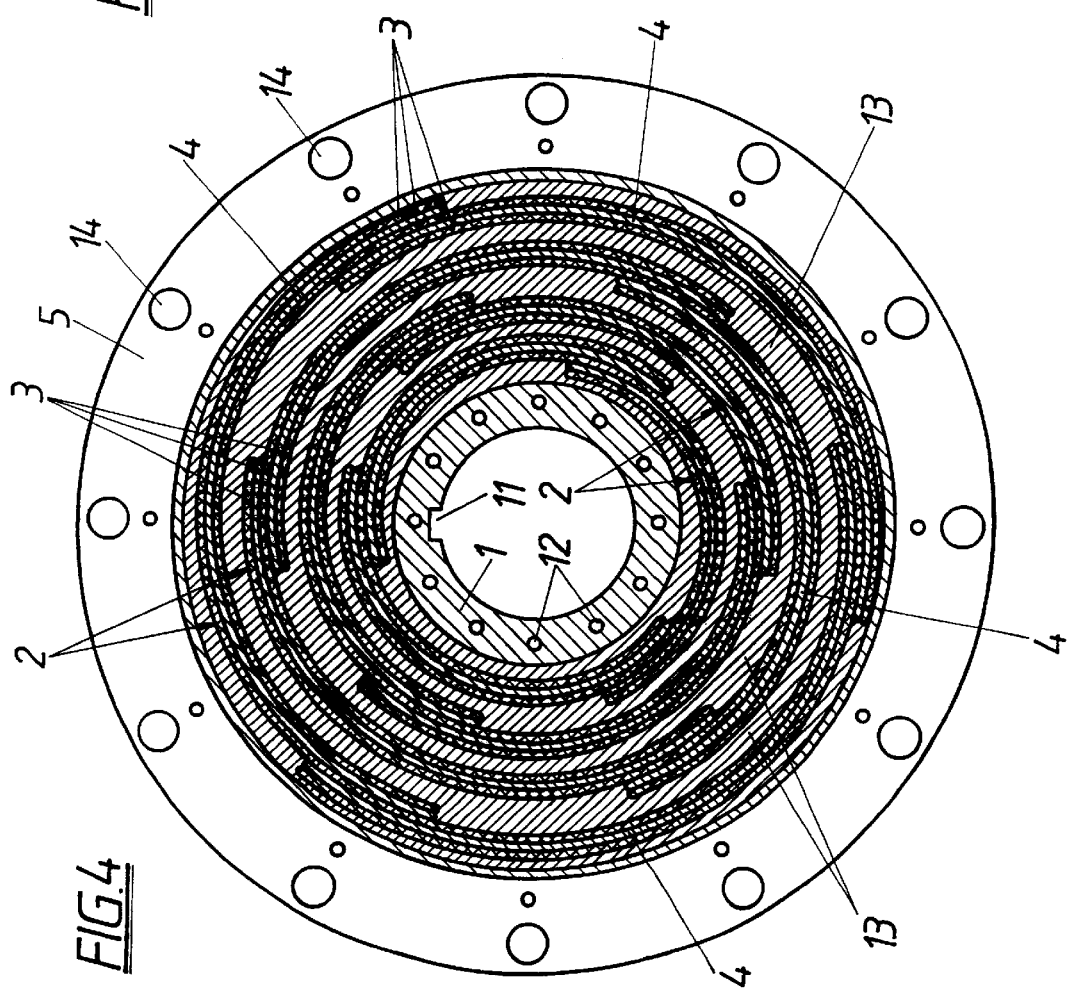

TORSIONALLY FLEXIBLE COUPLING

FIELD OF INVENTION

The invention refers to a torsionally flexible coupling with an outer rim flexibly rotatable against a hub.

DESCRIPTION OF THE PRIOR ART

To provide a plainly constructed torsionally flexible coupling in a driving connection, the attempt has already been made to arrange as a coupling a rubber-flexible disk, which is connected torsion-proof at the hub side to the one, and at the outer rim side the other of the drive trains to be connected. However, such rubber-flexible coupling disks can be applied only for transmission of comparatively low torques. For transmission of higher torques, either complex multi-disk rubber couplings are used, or couplings, the outer rim of which is connected to the hub via radial leaf springs. For damping of this torsionally flexible couplings, the liquid-filled chambers situated between the outer rim and the hub are hydraulically interconnected via choking ducts, so that liquid is displaced between the chambers, as soon as the outer rim and the hub are rotating against each other. Such damped torsionally flexible couplings, however, are complex in terms of construction.

According to DE 43 38 039 a flexible coupling for transmission of torques has been suggested, too, which is equipped with a flexible intermediate body arranged between the hub and the outer ring body, with train components running over one circumferential section each, and substantially engaged at the hub on the one hand, and at the outer ring body on the other hand. These train components running at acute angles to the tangents of the hub have the effect of flexible spokes and are likewise unsuitable for the transmission of higher torques.

Moreover, DE 42 01 597 A indicates a torsional vibraticon damper as already known, which is provided with 2spiral belts fitted into each other, with the gap between the belts being filled with a very viscous liquid. One end of each belt is connected to the other damper half, while the other end remains free, so that damped radial displacements of considerable order are possible. The result is a pure torsional vibration damper, which requires an additional flexible coupling, preferably a rubber coupling, to flexibly couple the two damper halves.

DE 40 06 121 A discloses a torsion damping facility accommodating a helical spring, acting upon the driving part with its inner end, and at the driven part with its outer end, in a damping chamber between a driving and a driven part. In case of a relative movement between the driving and the driven part, the thread of the helical spring in the damping chamber filled with a very viscous liquid makes a radial movement, too, which results in the damping effect. The helical spring creates a torsion damper with large torsion angles between the driving and the driven part, and with a special spring characteristic. This damper doesn's t furnish any new ideas for the construction of a flexible coupling for the transmission of higher torques.

SUMMARY OF THE INVENTION

Therefore, the invention has the task to design a torsionally flexible coupling of the above mentioned type in such a way that even high torques can be transmitted at sufficient torsional flexibility and a small construction volume with little expenditure of construction.

The invention solves the task by providing at least one ring-like compound body between the hub and the outer rim, consisting of at least one spiral layer of an elastomer, with the threads of this spiral layer being connected shear-resistant with a tensionally elastic and flexible intermediate layer filling the space between the threads. The elasticity of tension and of shearing of this intermediate layer is smaller than that of the elastomer layer.

As the flexible intermediate layer between the threads of the spiral elastomer layer are connected shear-resistant with this elastomer layer and has a smaller elasticity of tension and of shearing than the elastomer layer, the major part of the circumferential forces is transmitted via this intermediate layer, thus relieving the elastomer layer and permitting the coupling to transmit a considerably higher torque, at a construction volume equal to that of the rubberflexible coupling disks. The elastic properties of the elastomer layer, concurrent with the elasticity of tension of the intermediate layer ensure a sufficient torsional flexibility of the coupling, which, with corresponding dimensions, can be matched with the respective requirements via the circumferential length of the elastomer layer and the intermediate layer. Depending on the sense of the effective torque, the tensionally elastic and flexible intermediate layer is subject to tensile or compressive stress.

If only one spiral elastomer layer is provided, a certain incidental unbalance must be accepted. Therefore, in case of higher speeds, it is recommended to provide at least two layers of elastomer with corresponding intermediate layers arranged rotationally symmetrical, with the thread lengths of the elastomer layers extending over an angle at circumference exceeding the mutual angular distance of these layers. Due to the resulting overlap of the intermediate layers having a smaller elasticity of tension than the elastomer layers, it is ensured, that the major part of the circumferential forces over the total circumference of the ring-like compound body is transmitted via the intermediate layers.

In order to avoid an excessive constriction of the spiral ellastomer layers during tensile load of the intermediate layers at certain torque loads, two or more concentrically arranged compound bodies may be provided instead of one compound body, which are each interconnected via an intermediate ring, so that the angle of contact of the spiral layers in the area of the individual ring-shaped compound bodies is limited, and the spiral layers are supported at these intermediate rings. Thus the bending moment in the clamping area of the intermediate layers is significantly reduced, resulting in an immediate relief of these intermediate layers. Of course, the supporting effect of the intermediate rings sub-dividing the compound body into individual rings is also utilized in case of a torque load of the coupling in terms of a compressive stress of the intermediate layers, to prevent an undue untwining of the spiral threads.

The tensionally elastic intermediate layers between the spiral elastomer layers may be set up differently. However, especially favorable constructional features are achieved, if these intermediate layers are made of fiber reinforced plastic or of spring steel. Using fiber reinforced plastic in particular, the compound body can be easily built up by means of a winding procedure. The shear-resistant connection between the individual layers doesny's t raise any problems in this context.

BRIEF DESCRIPTION OF THE DRAWING

The drawing depicts an example of the subject matter of the invention.

FIG. 1 shows a torsionally flexible coupling according to the invention in an axial projection;

FIG. 2 shows this coupling in an axial section of this coupling following line II—II of FIG. 1.

FIG. 3 shows a construction variant of a torsionally flexible coupling according to the invention in an axial section, and FIG. 4 shows this coupling in a section normal to the axis following line IV—IV of FIG. 3.

DESCRIPTION OF THE PREFERRED EMBODIMENTS

The torsionally flexible coupling according to the design example of FIG. 1 and 2 has a hub 1 bearing a ring-like compound body 2, which is connected torsion-proof with the hub 1 via glued joint or micro-toothing. This compound body 2 is composed of spiral layers 3 of an elastomer, arranged rotationally symmetrical, the threads of which intermesh at a radial distance, with the space between the threads being filled with tensionally elastic and flexible intermediate layers 4, which are, for example, made of fiber reinforced plastic. Moreover, this fiber reinforced plastic connected shear-resistant with the elastomer layers 3, forms an external and an internal circumferential layer of the compound body 2. While the compound body 2 is connected to the hub 1 via the internal circumferential layer, the external circumferential layer forms an outer rim 5, where sleeves 6 are glued in for accommodation of connecting screws 7. Of course, a steel rim might be used as well instead of this outer rim 5 formed by the fiber reinforced plastic.

As can be inferred from FIG. 2, the torsionally flexible coupling is installed in the customary way between two shafts 8 and 9 of a drive train outlined in short dashes, such that the coupling with the hub 1 is seated on one of the shafts 8, while the outer rim 5 is bolted axially with the connecting flange 10 of the shaft 9 by means of the connecting screws 7. A major part of the torque to be transmitted between the outer rim 5 ,Ind the hub 1 is taken up by the intermediate layers 4 between the spiral elastomer layers 3, because these intermediate layers 4 have a smaller elasticity of tension and of shearing than the elastomer layers 3, so that the elastomer layers 3 are relieved, which results in a correspondingly high maximum transmitted torque at a given admissibe load of the elastomer layers 3. Due to the elasticity of tension of the intermediate layers 4, the required torsional flexibility of the coupling can be ensured via the elastomer layers 3 connected shear-resistant with these intermediate layers 4. The number of the elastomer layers 3 and the tensionally elastic intermediate layers 4, as well as their thread lengths, in connection with the relevant layer thickness and the coupling width, determine the torsionally flexible behaviour of the coupling, which may consequently be matched with the prevailing conditions via these parameters.

The torsion-proof connection between the hub 1 and the shaft 8 may be realized via a feather key. The feather key groove 11 is outlined in the hub 1, where there are also axial through bores 12 for ventilation of the coupling. Of course, hubs with tapered interference fit or flange hubs may be provided as well.

The torsionally flexible coupling according to FIG. 3 and 4 is distinguished from that of FIG. 1 and 2 essentially by the fact, that the threads of the elastomer layers 3 and the tensionally elastic intermediate layers 4 are not running through from the hub 1 to the outer rim 5, but are interrupted by intermediate rings 13, so that there are concentric compound bodies 2 consisting of spiral elastomer layers 3 between these intermediate rings 13, interconnected shear-resistant via one intermediate layer 4 each. These intermediate rings 13 may be made of the fiber reinforced plastic as provided for the intermediate layer 4, however, this is by no means imperative. The essential effect of these intermediate rings 13 is their supporting function, preventing that the elastomer layers 3, get inadmissibly constricted and/or that the elastomer spiral threads get untwined iin opposite direction in case of a torque load in opposite direction. Of course, the basic function of such a coupling composed of several concentrically arranged ring-shaped compound bodies is ensured.

While, in case of the design according to FIG. 3 and 4, the hub 1 is connected torsion-proof with the shaft 8 via a feather key, as in case of the coupling according to FIG. 1 and 2, connection is realized via a metal outer rim 5, which is equipped with through bores 14 for screwing down at the connecting flange 10 of the shaft 9.

Of course, the invention is not confined to the depicted design models. For example, two or more ring-shaped coupling bodies 2 can be axially arranged in tandem to create appropriate ventilation gaps between these compound bodies. Moreover, the coupling width can be optionally chosen for each diameter, with a view to optimization in terms of material and manufacturing technique.

What is claimed is:

1. Torsionally flexible coupling with an outer rim flexibly rotatable against a hub, comprising at least one ring-like compound body between the hub and the outer rim, the compound body consisting of at least one spiral layer of an elastomer, and the spiral layer having threads connected shear-resistant with a tensionally elastic and flexible intermediate layer, filling the space between the threads, wherein the elasticity of tension and of shearing of this intermediate layer is smaller than that of the elastomer layer.

2. Coupling according to claim 1, wherein at least two layers of an elastomer, arranged rotationally symmetrical, with the corresponding intermediate layers are provided, with the threads of the elastomer layers extending over an angle at circumference exceeding a mutual angular distance of these layers.

3. Coupling according to claim 1, comprising at laest two concentrically arranged compound bodies interconnected via an intermediate ring.

4. Coupling according to claim 1, wherein the intermediate layer is made of fiber reinforced plastic or spring steel.

* * * * *